United States Patent [19]

Iwasaki et al.

[11] Patent Number: 5,086,202
[45] Date of Patent: Feb. 4, 1992

[54] WIRE GUIDES FOR TRAVELING WIRE TYPE APPARATUS

[75] Inventors: Takeshi Iwasaki; Hisashi Yamada, both of Aichi, Japan

[73] Assignee: Mitsubishi Denki K.K., Tokyo, Japan

[21] Appl. No.: 559,800

[22] Filed: Jul. 30, 1990

[30] Foreign Application Priority Data

Oct. 23, 1989 [JP] Japan ................... 1-275176

[51] Int. Cl.⁵ ............................................. B23H 7/10
[52] U.S. Cl. ............................................. 219/69.12
[58] Field of Search ................. 219/69.12; 204/206, 204/224 M

[56] References Cited

U.S. PATENT DOCUMENTS 4,613,740  9/1986  Ichikawa ................. 219/69.12
4,686,344  8/1987  Nakayama ............... 219/69.12
4,883,933  11/1989  Yatomi et al. ............ 219/69.12

FOREIGN PATENT DOCUMENTS 56-3148   1/1981  Japan .
121420    9/1982  Japan .
193623    3/1988  Japan .
207524    6/1988  Japan .

Primary Examiner—Geoffery S. Evans
Attorney, Agent, or Firm—Sughrue, Mion, Zinn, Macpeak & Seas

[57] ABSTRACT

A wire guide of the type used in wire-type EDM machines is improved by separately manufacturing a ceramic collar or collars and the support which houses the die guide, and subsequently combining these elements within a casing. The use of ceramic ensures corrosion resistance, while separate manufacture assures that the die guide is not subjected to the potentially damaging heat required in firing the ceramic.

12 Claims, 4 Drawing Sheets

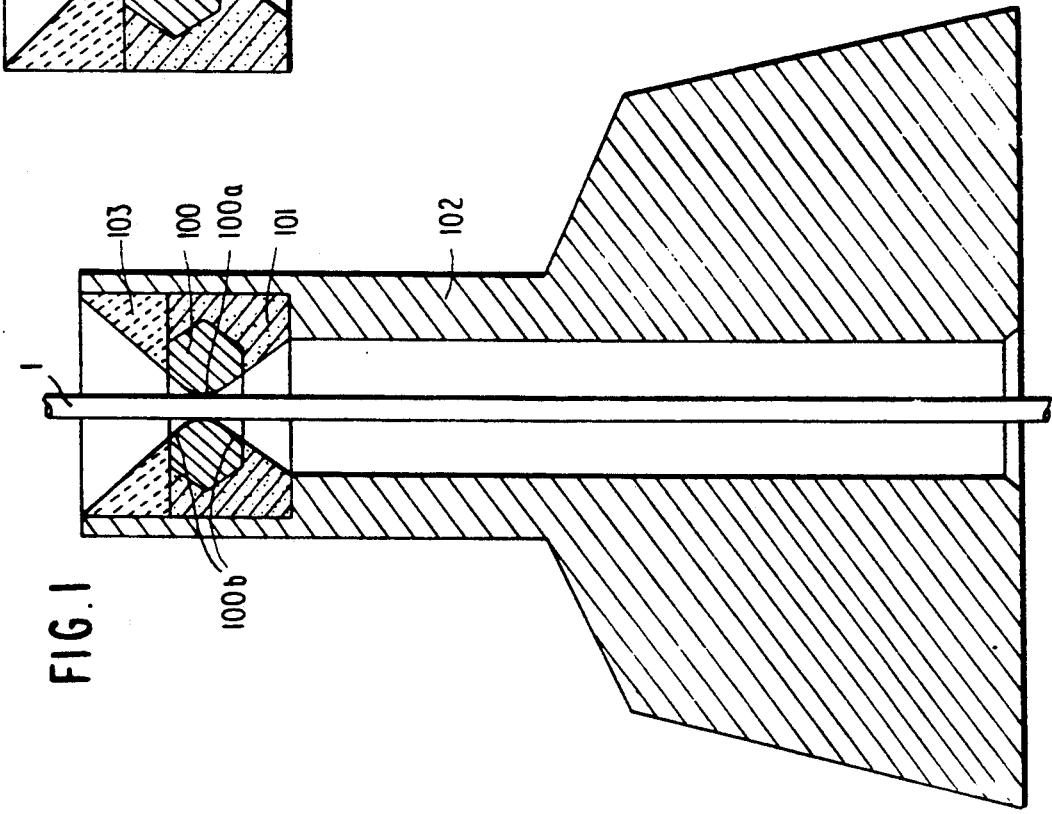

WIRE GUIDES FOR TRAVELING WIRE TYPE APPARATUS

BACKGROUND OF THE INVENTION

The present invention relates to the wire guides of wire type electrical discharge machining devices (hereinafter referred to as "wirecut EDMs") and especially to an improved support structure for the die guides.

FIG. 4 illustrates an example of a wirecut EDM of the prior art. In FIG. 4, numeral 1 indicates a wire electrode fed from a supply bobbin 2; 3, a brake roller directly coupled with an electromagnetic brake 3a for providing a predetermined tension on the wire electrode 1; and 4a, 4b and 4c, idlers for changing the running direction of the wire electrode 1. At 5 is a first top wire guide; 6 indicates a second top wire guide; 7, a top energizer; 8, a top dielectric nozzle; 9, a first bottom wire guide; and 10, a second bottom wire guide. At 11 is a bottom energizer; 12 indicates a bottom dielectric nozzle; 13, a pump for supplying the dielectric; 14, a pulse power supply unit for supplying a pulse voltage to a gap between the wire electrode 1 and the workpiece 15 via energizers 7 and 11; and 16, a wire feed roller.

The wirecut EDM of said structure functions as follows:

First, the wirecut EDM ejects dielectric from the nozzles 8 and 12 in the same axial direction as the wire electrode 1, while simultaneously applying a pulse voltage to a gap between the wire electrode 1 and the workpiece 15 from the pulse power supply unit 14. At the small gap between the wire electrode 1 and the workpiece 15, electrical discharge repeatedly occurs through the medium of the dielectric to melt and cut the workpiece 15 by means of the thermal energy generated at the time of electrical discharge incidental to the vaporization and explosion of the dielectric.

Relative motion between the wire electrode 1 and the workpiece 15 is generally carried out by controlling an X-Y table (not illustrated) numerically. By repeating the electrical discharge and controlling the X-Y cross table as mentioned above, the wirecut EDM of the prior art is designed to machine the workpiece 15 into a given contour.

To apply the said pulse voltage to the wire electrode 1 via the top energizer 7 and the bottom energizer 10, the wire electrode 1 is pressed against the energizers 7 and 10 by the second top wire guide 6 and second bottom wire guide 10 and runs while simultaneously sliding against the energizers 7 and 10.

FIG. 5 illustrates detailed examples of the first top wire guide 5 and the first bottom wire guide 9 in the prior art shown in FIG. 4. The structure shown in FIG. 5 is similar to that disclosed in Kokai Nos. 1981-3148 or 1982-121420, for example. Another known wire guide structure is illustrated in Kokai No. 1988-207524.

Referring to FIG. 5, the numeral 100 indicates a die guide made of an extremely hard material such as diamond or sapphire. Its center is a bearing 100a abutting and supporting the wire electrode 1. The portion gradually increasing in diameter from the center to the upper end is the approach 100b. At 101 is a support member which encloses and centers the die guide. A case 102 accommodates and secures the die guide 100 and the support member 101. As described above, in a wirecut electrical discharge machining process, a pair of wire guides are located on both sides of the workpiece, the workpiece and the pair of top and bottom wire guides are moved relatively to each other by numerical control, and at the same time, pulsed electrical energy and dielectric are supplied to a gap between the wire electrode and the workpiece to generate repeated electrical discharge, erode the workpiece locally, and machine a desired contour with high accuracy. Accordingly, displacement at the support point of the wire electrode must be minimized, and the clearance between the bearing 100a and the wire electrode 1 must be designed to be extremely small, generally between approximately 2 and 10 $\mu$m.

In starting wirecut EDMing, the electrode 1 is pulled from the wire supply bobbin 2 in a predetermined wire electrode path including the said wire guides 100. The above process may either be performed manually or automatically using a wire electrode supplier. In either case, for the above reason, it is not easy to insert the wire electrode 1 into the die guide 100 because of the small clearance. In order to smoothly introduce an end of the wire electrode 1 into the bearing portion 100a of the die guide 100, the approach 100b is designed to have a conically smooth curve, and similarly, the inside of the support member 101 is conically shaped to gradually decrease in diameter toward the approach 100b. In addition, to protect the end of the wire electrode 1 from being caught during entry of the wire electrode 1 into the die guide 100, the insides of the die guide 100 and the support member 101 are finished to an extremely smooth surface roughness (e.g., about 1.2$\mu$), and the abutment of the die guide 100 and the support member 101 is curved continuously so that no reverse step occurs in the insertion direction of the wire electrode 1. The wire guide of the prior art is generally made in a manufacturing process illustrated in FIG. 6 to form a smooth guide surface without generating a step between the die guide 100 and the support member 101. In FIG. 6, (a) indicates the process of grinding the top and bottom surfaces of a gemstone, such as diamond or sapphire, in parallel; (b) is a process of covering the die guide 100 and performing sintering using a powdered metal (e.g., WC-CO); (c) illustrates the process of drilling the sintered body by laser cutting, etc., (d) shows the process of forming a desired shape by ultrasonic machining, etc.; and (e) is a lapping process (e.g., first the machined surface is lapped with grit of 3 to 6$\mu$ diameter, then with grit of 0 to $\frac{1}{2}\mu$ diameter) for improving the surface roughness and smoothing the cut surface. The process may use metal wires, diamond grit, etc.

The wirecut EDM of the prior art employs a support member 101 formed through metal powder sintering, which is high in machinability as well as mechanical strength, for holding the die guide 100. High mechanical strength is needed to permit the wire guide to sustain the large mechanical forces, such as lateral forces, encountered during machining. However, as wirecut EDMing is performed over a long period of time, the prior art support member 101 will be corroded as shown in FIG. 7. Several factors cause this corrosion. The first factor is an electro-corrosion effect created by the coaction of sludge and water. In wirecut EDMing, electrical discharge occurs in the gap between the workpiece 105 and the wire electrode 1, and part of the workpiece 105 and the wire electrode 1 enter into the dielectric as sludge during dissolution and cooling. This sludge floats in the dielectric during EDMing, but when EDMing stops, it remains in the conical recess formed by the wire guide support member 101 and the die guide 100, and a lot of sludge sinks to the neighborhood of the die guide 100. The dielectric stays in the recess due to its surface tension for a long period of time. For this reason, in the neighborhood of the die guide 100, corrosion is prone to progress by local electrochemical action.

The second contribution to corrosion is attributable to the polarization of the wire electrode 1 and the support member 101, which is assumed to dissolve the positive pole or generate micro-electrical discharges. If the aforementioned corrosion progresses, a reverse step (like a counterbore) will be generated in the insertion direction of the wire electrode 1 as shown in FIG. 7 and prevent the wire electrode 1 from being inserted. Likewise, since the surface roughness of the inside surface of the support member 101 will increase due to erosion, the end of the wire electrode 1 may be caught by the inside surface of the support member 101 when it is inserted. If the corrosion further progresses, the die guide 100 may fall if there is even slight external force. In the above situations, the wire electrode is extremely difficult to insert even manually, and especially when it is inserted by an automatic wire electrode supplier, a serious problem occurs in that the wire electrode cannot be inserted, the subsequent EDM operation cannot be started, and automatic operation comes to a stop. To improve these defects, the prior art shown in FIG. 9 has been suggested (refer to Japanese Kokai No. 1988-193623.)

The art shown in FIG. 9 still has the following problems, although it solves problems of corrosion by using a ceramic material for the support member 101.

To make the device shown in FIG. 9, it is still necessary to use a manufacturing process such as illustrated in FIG. 6. In the process wherein the ceramic material is sintered to cover the die guide with ceramic as shown in FIG. 6(b), the ceramic material must be sintered at 1000° C. to 1500° C.

However, when diamond is used as a die guide material, its surface carbonizes at 200° C., and diamond begins to deteriorate in mechanical strength at 600° C. and higher, and changes in quality as the temperature rises. Accordingly, the die guide will probably change in quality when the ceramic material is sintered.

Furthermore, the processes of drilling, forming and lapping as in FIGS. 6(c), (d) and (e) will be extremely difficult in the case of ceramic.

Therefore, using the ceramic material on the whole support member 101 is not realistic.

Accordingly, it is an object of the present invention to resolve the said defects and provide easily manufactured wire guides for wirecut EDMs.

SUMMARY OF THE INVENTION

The wire guides of the present invention are equipped with die guides having a hole into which the wire electrode is inserted, support members which enclose the die guides, and conically configured collars, having a hole where the wire electrode is inserted, and made of an electrically insulating material such as ceramic at least on the inlet side of the die guide.

In addition, in the present invention, the inner diameter of that portion of the inlet-side collar which abuts the die guide may be slightly smaller than that of the portion of the die guide abutting that collar.

Moreover, in the present invention, the inner diameter of that portion of the outlet-side collar which abuts the die guide may be slightly larger than that of the portion of the die guide abutting that collar. Furthermore, in the present invention, the inner wall area of a portion of the collar abutting the die guide is straightened.

The wire guides of the present invention employ an electrical insulating material such as ceramic for the collars which act as wire electrode guides, to prevent the guide surface profile from changing and the surface roughness from deteriorating due to electrochemical corrosion. Further, the die guides and collars can be manufactured easily because they may be made by different processes and then combined and tightened.

The inner diameter of the portion of the wire inlet-side collar abutting the die guide can be slightly smaller than that of the portion of the die guide abutting the collar, and the inner diameter of the portion of the wire outlet side collar abutting the die guide may be slightly larger than that of the portion of the die guide abutting the collar, so that when the wire guide is made by combining the die guide with collars manufactured by different processes, the wire electrode may be smoothly guided. The collar can be used over long periods without producing a reverse step in the insertion direction. Further, by straightening the inner wall area of the portion of the collar abutting the die guide, dimensional management of the collar may be facilitated, and the collars, even if made of slightly fragile ceramic, will not crack easily during manufacture or use.

BRIEF DESCRIPTION OF THE DRAWINGS

FIG. 1 is a sectional view showing one embodiment of a wire guide for a wirecut EDM machine, in accordance with the present invention.

FIG. 2 is a detailed sectional view showing the die guide and support member of the embodiment in FIG. 1.

FIG. 3 is a sectional view of a wire guide according to an alternate embodiment.

In the above figures, wherein the numerals in the different views identify identical or corresponding parts, 1 indicates a wire electrode, 100 a die guide, 101 a support member, 102 a case, and 103 a collar made of ceramic.

DETAILED DESCRIPTION OF THE PREFERRED EMBODIMENTS

Figure 5:
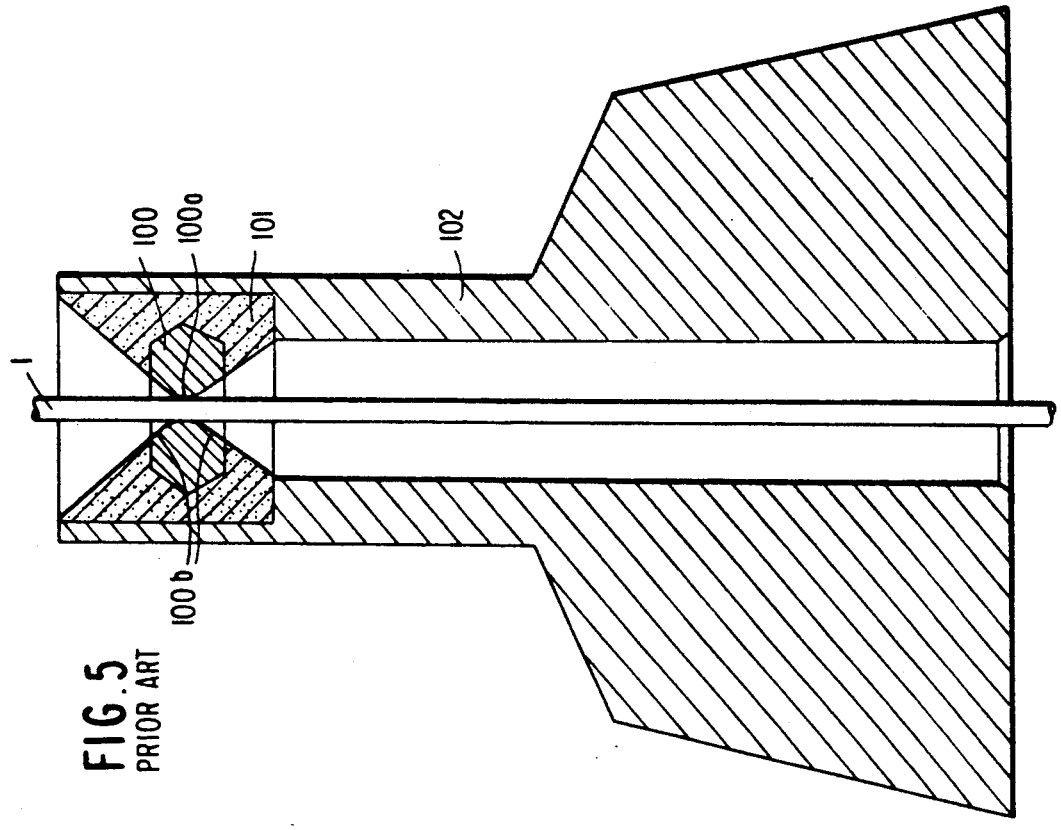
FIG. 5 is a sectional view showing a wire guide of the prior art.
Figure 7:
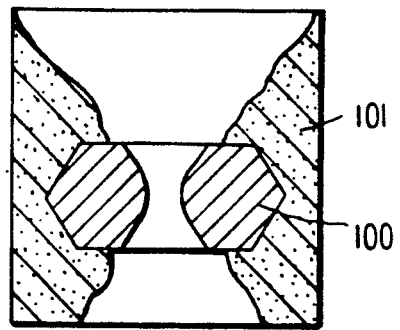
FIGS. 7 and 8 are explanatory diagrams illustrating the problems of the wire guides of the prior art.
Figure 8:
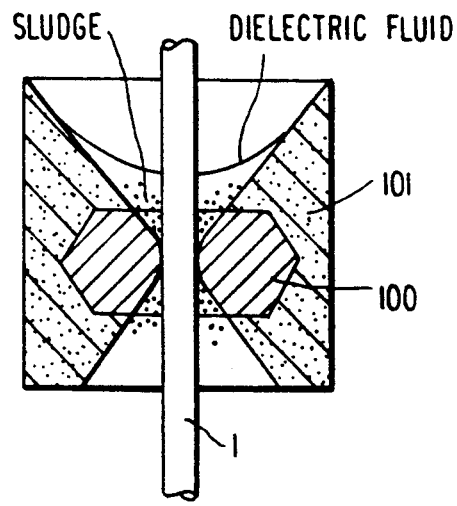
Figure 9:
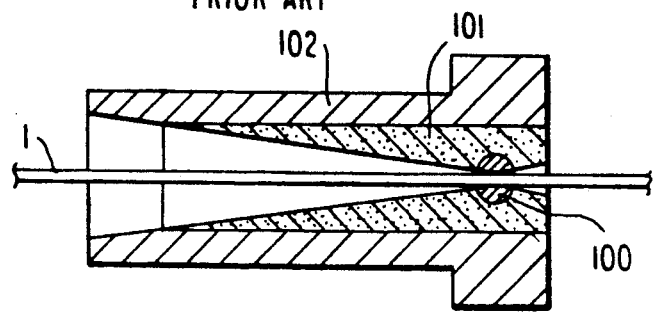
FIG. 9 is a sectional view showing another prior art wire guide.

Referring now to the drawings, the numerals in FIGS. 1 and 5 identify identical or corresponding parts. Numeral 100 indicates a die guide made of an extremely hard material such as diamond, sapphire, etc.; 101, a support member similar to the one in the prior art, surrounding the die guide 100 and composed of a sintered powdered metal; and 103 a collar made of ceramic and having a conical guide surface which gradually decreases in diameter toward the die guide 100. Numeral 102 indicates a metallic support or casing which contains the die guide 100, support member 101 and collar 103. The die guide 100 and the support member 101 are manufactured by processes similar to those of the prior art and fixed to the case 102 by brazing, bonding with epoxy resin adhesive, etc. The collar 103 is separately formed by sintering alumina, silicon nitride or other ceramics having electrical insulating properties, using a mold, or by turning ceramic of low hardness and having electrical insulating properties. The collar is then secured to the case 102 by bonding with epoxy resin adhesive, etc. or by caulking to the case 102. In this case, the collar 103, the die guide 100 and the support member 101 may all be bonded with epoxy adhesive, etc. Since the collar 103 and the die guide 100 are machined in different processes and then combined, there cannot be guaranteed a continuous curve at their abutment due to dimensional variations. As shown in FIG. 2, therefore, it is desirable to make the minimum diameter at the die guide side of the collar slightly smaller in dimension (diameter difference: 0.1 mm or less) than the maximum opening diameter of the die guide introducing portion so that there will be no reverse step in the insertion direction. In addition, providing a straight area (0.5 mm or less) on the die guide side of the collar instead of a sharp edge allows easier dimensional management and makes slightly fragile ceramic more difficult to crack during manufacture and use. Since the collar is made of ceramic that has electrical insulating properties and chemical corrosion resistance as described above, the wire guide is not subjected to electrical or chemical corrosion, the profile and surface roughness of the conical guide surface remain unchanged over a long period, the wire electrode can be inserted smoothly, and the wire guide can be manufactured easily. It will be appreciated that the collar 103 located on the inlet side of the wire electrode may also be located on the outlet side as shown in FIG. 3 so as not to expose the support member and thereby prevent the die guide from dropping due to corrosion of the support member on the outlet side. In this case, as a matter of course, it is desirable to set the diameters of the collar and the die o guide on the top side to be in the relationship as shown in FIG. 2, and the diameters of the collar and the die guide 100 on the bottom side to be in the opposite relationship i.e., the minimum diameter of the bottom collar 103 being slightly larger than the maximum opening diameter of the die guide, to prevent a reverse step from being produced between the die guide 100 and collar 103.

It will be appreciated that the ceramic material used for the entire collar 103 in the pictured embodiment may be used only on the guide surface itself and still allow the primary purpose to be achieved. That is, a conical sleeve formed of a ceramic material may be fitted into a support member made of a WC-CO material or the like for use as a guide surface for the wire electrode.

Figure 4:
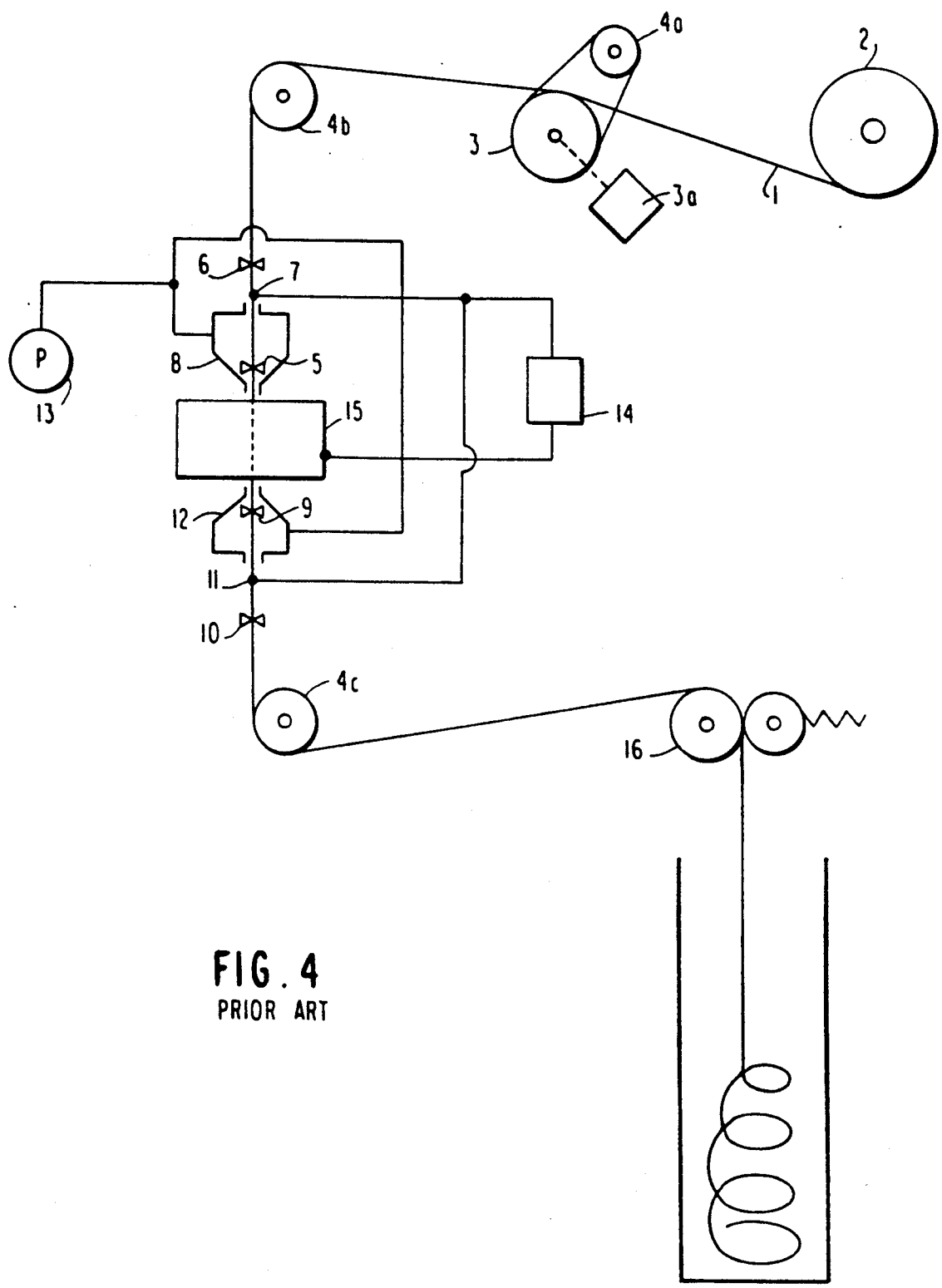
FIG. 4 is a general view of the wirecut EDM of the prior art.
Figure 6B:
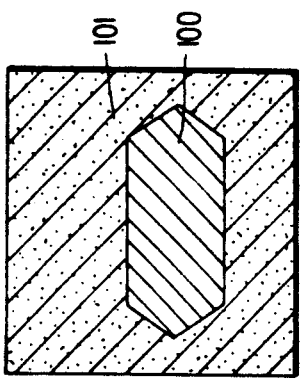
FIG. 6 is a diagram showing a process of manufacturing the wire guides in the prior art.
Figure 6D:
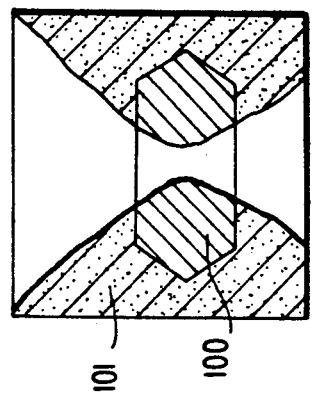
Figure 6A:
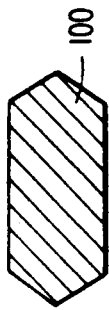
Figure 6C:
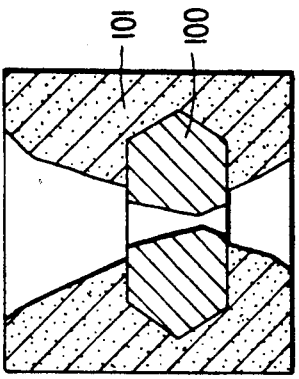
Figure 6E:
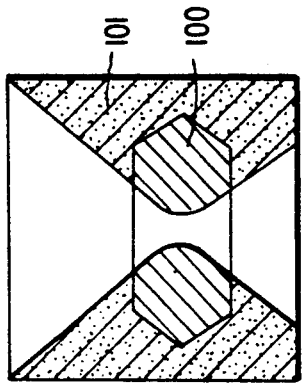

It will be appreciated also that the ceramic material used for the collar may be replaced with other materials having characteristics equivalent to the ceramic. It will be appreciated further that, in a wirecut EDM, the present invention is readily applicable to the guiding wire guides which introduce the wire electrode into its insertion path or to the pressing wire guides 6 and 10, shown in FIG. 4, for pressing the wire electrode against the power supply elements or energizers which supply EDMing power, as well as to the pair of die guides used at the top and bottom of the workpiece. The invention is also applicable broadly o outside of the EDM area, in any situation where a wire guide may be desirable. The EDM environment of the preferred embodiment is an exemplar only, and not a limitation on the invention.

It will be apparent that the invention, as described above, provides collars made of ceramic, etc. at least on the inlet side of the die guides so as to prevent the occurrence of a reverse step and deterioration of the surface roughness resulting from profile changes influenced by electrical o chemical corrosion of the conical guide surface, to allow smooth and reliable insertion of the wire electrode, especially in the case of insertion by means of an automatic wire electrode supplier. The wire guides may be manufactured easily at low cost because they can be made by combining die guides and collars manufactured by different processes.

What is claimed is:

1. A guide for traveling wire, comprising:
    a die guide having a hole for insertion of the wire;
    a support member surrounding said die guide; and
    at least one collar having a generally conical interior contour and a hole for passage of said wire, and made of a corrosion resistant electrical insulating material, said at least one collar being located at least on an inlet side of said die guide as an aid in the insertion of said wire and having its smaller diameter end facing said die guide, wherein an inside diameter of that portion of the wire inlet-side collar adjacent the die guide is slightly smaller than that of that portion of the die guide adjacent the collar.

2. A device as defined in claim 1, further including a wire outlet-side collar, and wherein an inside diameter of that portion of the wire outlet side collar adjacent the die guide is slightly larger than that of that portion of the die guide adjacent the collar.

3. A device as defined in claim 1, wherein an inner wall area of that portion of the collar adjacent said die guide is linear.

4. A device as defined in claim 1, wherein said at least one collar is formed separately from said support member and subsequently combined therewith to form said guide.

5. A device as defined in claim 1, wherein said collar is comprised of a ceramic material.

6. A device as defined in claim 1, wherein said support member is comprised of a sintered metal.

7. A device as defined in claim 1, wherein said collar is formed as an insert fitted in said support member.

8. A device as defined in claim 1, further comprising a casing for housing said support member, said at least one collar and said die guide, at least said support member being fixed to said casing.

9. A device as defined in claim 8, wherein said at least one collar is fixed to said casing.

10. A guide for traveling wire, comprising:
    a die guide having a hole for insertion of the wire;
    a support member surrounding said die guide; and
    at least one collar having a generally conical interior contour and a hole for passage of said wire, and made of a corrosion resistant electrical insulating material, said at least one collar being located at least on an inlet side of said die guide as an aid in the insertion of said wire and having its smaller diameter end facing said die guide, further including a wire outlet-side collar, and wherein an inside diameter of that portion of the wire outlet side collar adjacent the die guide is slightly larger than that of that portion of the die guide adjacent the wire outlet-side collar.

11. A device as defined in claim 10, wherein said support member is shielded from the inner periphery of said guide by said die guide and said inlet and outlet-side collars.

12. A guide for traveling wire, comprising:
a die guide having a hole for insertion of the wire;
a support member surrounding said die guide; and
at least one collar having a generally conical interior contour and a hole for passage of said wire, and made of a corrosion resistant electrical insulating material, said at least one collar being located at least on an inlet side of said die guide as an aid in the insertion of said wire and having its smaller diameter end facing said die guide, wherein an inner wall area of that portion of the wire inlet-side collar adjacent said die guide is cylindrical, such that said inner wall area is coaxial with respect to said wire.

* * * * *